United States Patent
Lu et al.

(10) Patent No.: US 9,515,831 B2
(45) Date of Patent: Dec. 6, 2016

(54) REDUCING THE EFFECTIVENESS OF SMUDGE AND THERMAL IMAGING ATTACKS

(71) Applicant: VMware, Inc., Palo Alto, CA (US)

(72) Inventors: Kecheng Lu, Beijing (CN); Jian Ouyang, Beijing (CN); James Kiryakoza, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 41 days.

(21) Appl. No.: 14/514,401

(22) Filed: Oct. 15, 2014

(65) Prior Publication Data

US 2016/0112199 A1   Apr. 21, 2016

(51) Int. Cl.
  *G06F 21/00* (2013.01)
  *H04L 9/32* (2006.01)
  *G06F 21/31* (2013.01)
  *H04L 29/06* (2006.01)

(52) U.S. Cl.
  CPC ............. *H04L 9/3226* (2013.01); *G06F 21/31* (2013.01); *H04L 9/32* (2013.01); *H04L 63/083* (2013.01); *H04L 63/10* (2013.01)

(58) Field of Classification Search
  CPC .......... H04L 63/08; H04L 9/3226; H04L 9/32; G06F 21/31; G06F 21/46; H04W 12/06
  USPC .......... 726/5, 27, 28; 713/183, 184; 709/225
  See application file for complete search history.

(56) References Cited

U.S. PATENT DOCUMENTS

| | | | |
|---|---|---|---|
| 8,370,926 B1* | 2/2013 | Satish | G06F 21/36 380/270 |
| 2006/0136737 A1* | 6/2006 | Bauchot | G06F 21/31 713/183 |
| 2006/0265278 A1* | 11/2006 | DiMeo | G06Q 30/0235 705/14.35 |
| 2011/0225638 A1* | 9/2011 | Nahari | G06F 21/46 726/7 |

OTHER PUBLICATIONS

"Android and Data Loss Protection", Whisper Systems, Jul. 18, 2011, Retrieved on Oct. 15, 2014 from <URL: http://archive.today/OiCe2>.

* cited by examiner

*Primary Examiner* — Saleh Najjar
*Assistant Examiner* — Feliciano Mejia (57) ABSTRACT

An example method is provided for an electronic device, which may have a display and an input interface, to perform password authentication. The example method may include generating at least one sequence of input elements for entry during the authentication of the user's password to disguise entry of the user's password via the input interface by increasing the user's contact with the input interface and prompting, on the display, for an entry of the user's password and the at least one sequence of input elements via the input interface. The example method may further include receiving, via the input interface, entry of the user's password and the at least one sequence of input elements and determining whether the authentication is successful by checking whether the received entry is correct.

17 Claims, 7 Drawing Sheets

REDUCING THE EFFECTIVENESS OF SMUDGE AND THERMAL IMAGING ATTACKS

BACKGROUND

Unless otherwise indicated herein, the approaches described in this section are not admitted to be prior art by inclusion in this section.

Most electronic devices have a security feature for controlling access using a password. For example, when a computing device (e.g., mobile phone, laptop computer) is in a locked state, a user is required to enter a password to unlock the device. When using an automated teller machine (ATM) or point-of-sale (POS) terminal, a personal identification number (PIN) must be entered correctly in order to access funds from an account.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Many password authentication approaches are susceptible to security breaches. For example, a "smudge attack" may be used to discern a mobile phone's password based on oily smudges left by a user's finger on a touch-sensitive display. The oily smudges may be detected using cameras and image processing software, or even through naked eyes, to infer the user's password. In another example, thermal imaging technology may be used to steal a personal identification number (PIN) entered at an automated teller machine (ATM) or point-of-sale (POS) terminal. A thermal imaging camera may be used to capture a thermal image of the heat left on a physical keypad after being touched by a user. Based on thermal intensity inferable from the thermal image, the numbers entered may be determined.

According to examples of the present disclosure, the risk of password thefts may be reduced by generating, and requiring the entry of, at least one sequence of input elements during password authentication on an electronic device. The entry of the sequence of input elements increases a user's contact with an input interface (e.g., touch-sensitive display, physical keypads, etc.) of the electronic device. This causes additional smudges or heat on the input interface, thereby disguising entry of the user's password via the input interface and making it more difficult for attackers to discern the user's password.

Figure 1:
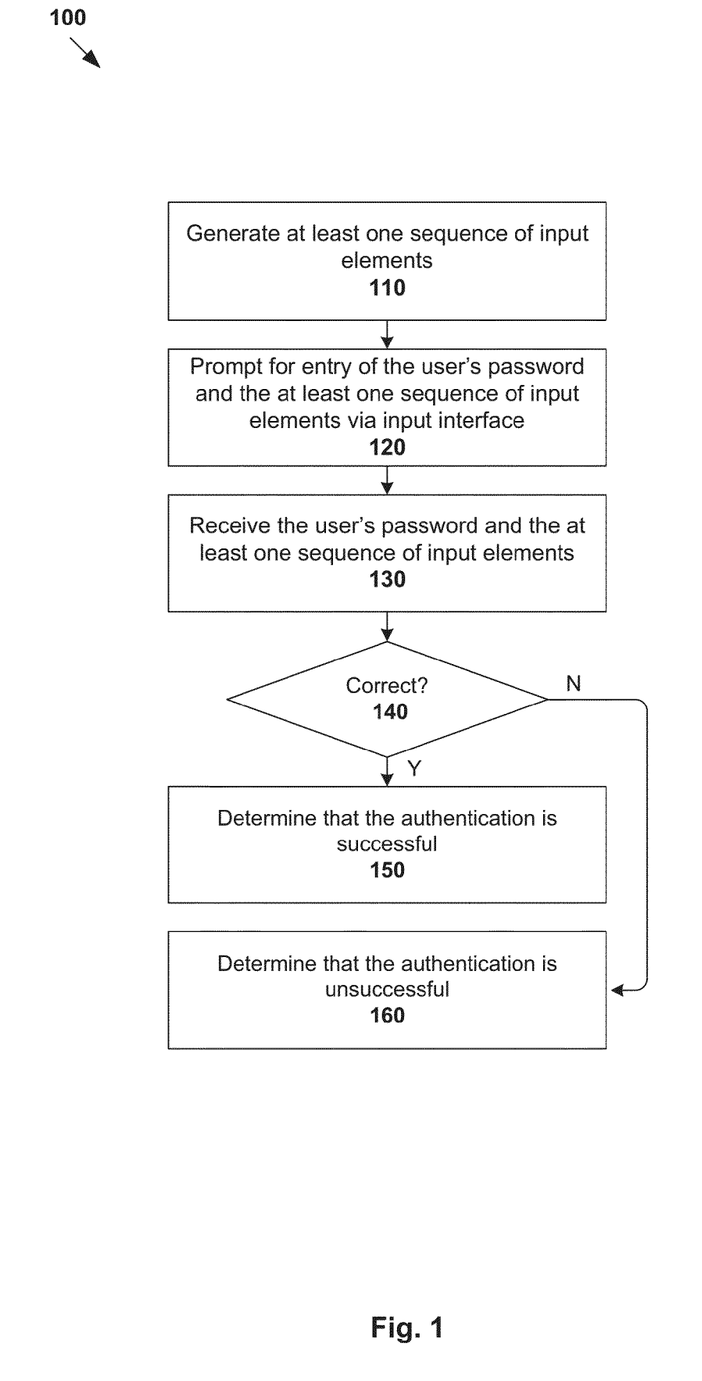
FIG. 1 is a flowchart of an example process for password authentication on an electronic device.

In more detail, FIG. 1 is a flowchart of example process 100 for password authentication on an electronic device. Example process 100 may include one or more operations, functions, or actions illustrated by one or more blocks, such as blocks 110 to 160. The various blocks may be combined into fewer blocks, divided into additional blocks, and/or eliminated based upon the desired implementation.

The electronic device may be any suitable computing device that requires password authentication, such as a mobile phone (e.g., smart phone), wearable computer (e.g., smart watch), tablet computer, laptop computer, desktop computer, etc. The electronic device may also be an ATM, POS terminal, or any other password-protected system (e.g., electronic password system for doors, cabinets, safes, etc.). Example process 100 may be implemented by an operating system of the electronic device, or a software application (e.g., App) supported by the electronic device.

Authentication of a user's password may be performed in any suitable scenario. For example, the authentication may be required to control access to the electronic device (e.g., to unlock a smart phone or tablet computer), or an Internet website or software application accessible via the electronic device. In the case of an ATM or POS terminal, the authentication of the user's PIN may be required to access funds for a transaction.

At block 110 in FIG. 1, the electronic device generates at least one sequence of input elements for entry during the authentication of the user's password to disguise entry of the user's password via an input interface of the electronic device by increasing contact of the user with the input interface. The term "sequence of input elements" is used broadly to refer to a set of input elements, where the input elements may include alphanumeric, numeric and gesture-based elements, etc.

At block 120 in FIG. 1, the electronic device prompts, on a display of the electronic device, for an entry of the sequence of input elements via the input interface. The entry of the user's password via the input interface is therefore disguised through the entry of the at least one sequence of input elements. The input interface may include one or more keys for entering the user's password and at least one sequence of input elements, such as alpha keys, numeric keys, functional keys and gesture-based keys, etc.

At block 130 in FIG. 1, the electronic device receives, via the input interface, the user's password and the sequence of input elements. At block 140, the electronic device determines whether the authentication is successful by checking whether the received entry is correct. If the received entry is correct, the electronic device determines that the authentication is successful in block 150, but otherwise that the authentication is determined to be unsuccessful in block 160.

Any suitable sequence or sequences may be generated at block 110, such as a prefix sequence and a postfix sequence. The prefix sequence may be generated for entry before the user's password is prompted (e.g., randomly using a random number generator). Additionally or alternatively, the postfix sequence may be generated for entry after the user's password is prompted. The prefix sequence may be generated based on, at least in part, the user's password. The postfix sequence may be generated based on, at least in part, the prefix sequence or user's password, or both. Depending on user configuration, the authentication process may use the prefix sequence or postfix sequence, or both.

Using the sequence of input elements, the user's contact with the same input interface increases during the authentication process. In some examples, the input interface may be a soft keypad or keyboard displayed on a touch-sensitive display of the electronic device. Using example process 100, the entry of the sequence of input elements results in additional smudges on a touch-sensitive display and disguises the entry of the user's password. Due to the extra smudge patterns that need to be analysed by a password thief, the sequence of input elements increases the complexity involved in guessing the user's password.

The example process 100 may be implemented using existing input interface. For example, it is not necessary to rearrange soft keys of the input interface, which some users find confusing. As such, example process 100 may be implemented by an electronic device with a physical keypad or keyboard as an input interface, such as ATM, POS terminal, laptop computer, etc. Due to the entry of the sequence of input elements, there will be additional keys on which heat is left by the user, which disguises the entry of the user's password. This makes it more difficult to guess the user's password based on a thermal image of the input interface after the user's password and the sequence of input elements are entered.

In the rest of the disclosure, examples of the prefix sequence and postfix sequence will be explained with reference to FIG. 2; FIGS. 3A, 3B, 3C, and 3D (e.g., sequences with numeric input elements), FIGS. 4A, 4B, 4C and 4D (e.g., sequences with alphanumeric input elements); FIGS. 5A, 5B, 5C and 5D (e.g., sequences with gestures) and FIGS. 6A, 6B, 6C, and 6D (e.g., sequences entered using a physical keypad). An example electronic device will be explained with reference to FIG. 7. In the following, the term "sequence of input elements" will also be referred to as "sequence" for simplicity.

Prefix and Postfix Sequences

Figure 2:
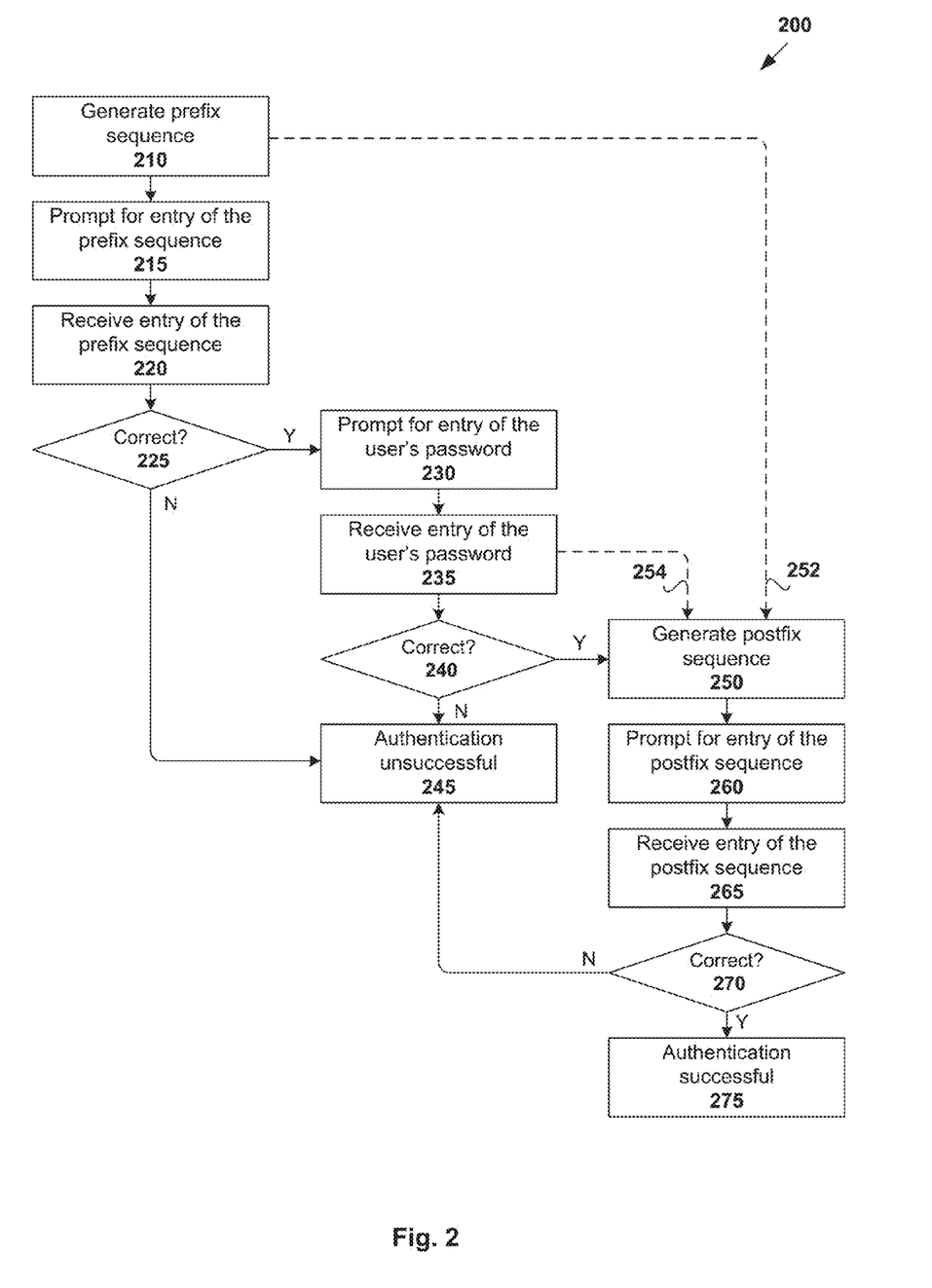
FIG. 2 is a flowchart of an example process for password authentication on an electronic device using a prefix sequence and a postfix sequence.

FIG. 2 is a flowchart of example process 200 for password authentication on an electronic device (e.g., computing device) using a prefix sequence and a postfix sequence. Example process 200 may include one or more operations, functions, or actions illustrated by one or more blocks, such as blocks 210 to 275. The various blocks may be combined into fewer blocks, divided into additional blocks, and/or eliminated based upon the desired implementation.

Blocks 210 to 275 in FIG. 2 are related to blocks 110 to 160 in FIG. 1. In particular, blocks 210 to 275 may be performed after an electronic device determines that authentication of a user's password is required. For example, the electronic device may be a computing device (e.g., smart phone, tablet computer, smart watch, etc.) that enters a "locked" state when it is not used for a while or when the user provides input to lock the computing device. While in a locked state, features of the computing device are generally restricted and authentication is required to unlock it.

Example process 200 will be described with reference to FIGS. 3A, 3B, 3C and 3D, which illustrate example user interfaces of computing device 300 during password authentication where the user's password is entered via soft keypad 330. In the examples shown, computing device 300 includes touch-sensitive display 310 that displays soft keypad 330 having with numeric keys "0" to "9". The term "touch-sensitive display" (also known as "touch-sensitive display") may generally refer to a physical structure that enables user 320 to interact with computing device 300 using touch inputs (e.g., finger inputs, stylus inputs, etc.).

Touch-sensitive display 310 may sense a touch input in a number of ways, such as by a change in an electrical parameter (e.g., resistance or capacitance), infrared radiation proximity detection, light variation detection, proximity sensor, etc. Contact with touch-sensitive display 310 may be detected by determining whether a contact has been made (e.g., "finger-down" event), whether the contact has been moved (e.g., "finger-dragging" event) and whether the contact has ceased (e.g., "finger-up" event).

At block 210 in FIG. 2 (related to 110 in FIG. 1), a prefix sequence is generated for entry by user 320 via touch-sensitive display 310 before entry of the user's password is prompted. The prefix sequence may be generated using any suitable approach, such as randomly using a random sequence generator. In the example in FIG. 3A, the prefix sequence is randomly generated as a four-digit code (e.g., "1234").

In another example, the prefix sequence may be generated based on, at least in part, the user's password (e.g., "2326"). In this case (not shown in FIG. 2 for simplicity), computing device 300 accesses the user's password to determine a set of keys (e.g., soft keys on keypad 330) required for entering the user's password. The user's password may be accessed from a local or remote storage using any suitable approach, such as based on the user's username or an identifier of computing device 300, etc. The prefix sequence may be generated to exclude keys used for entry of the user's password. For example, the prefix sequence may be generated as "1454", which is different to "1234" shown in FIG. 3A to exclude "2", "3" and "6". Entry of the prefix sequence therefore increases or maximizes the amount of smudges on touch-sensitive display 310.

At block 215 in FIG. 2 (related to 120 in FIG. 1), the entry of the prefix sequence is prompted on touch-sensitive display 310. As shown in the example in FIG. 3A, the prefix sequence (e.g., "1234") may be displayed on touch-sensitive display 310 to prompt user 320 for entry (see 340). To increase usability, the relevant keys on keypad 330 may be highlighted (e.g., "1", "2", "3" and "4") to simplify the entry process.

At blocks 220 and 225 in FIG. 2 (related to 130 and 140 in FIG. 1), the prefix sequence is received and checked by computing device 300. If entered correctly, example process 200 proceeds to block 230, but otherwise, it is determined that authentication is unsuccessful (see block 245). In this case, blocks 210 to 225 may be repeated if user 320 wishes to attempt the authentication process again.

At block 230 in FIG. 2 (related to 120 in FIG. 1), after the entry of the prefix sequence is prompted, computing device 300 prompts user 320 to enter the user's password. See 350 in the example in FIG. 3B.

At blocks 235 and 240 in FIG. 2 (related to 130 and 140 in FIG. 1), the user's password is received and checked whether it is correct. If yes (correct), example process 200 proceeds to block 250. Otherwise (incorrect), it is determined that authentication is unsuccessful (see block 245). In this case, example process 200 may proceed to block 210 (generate prefix sequence) or block 230 (prompt for entry of the user's password) again if user 320 wishes to attempt the authentication process again.

At block 250 in FIG. 2 (related to 110 in FIG. 1), a postfix sequence is generated for entry by user 320 via touch-sensitive display 310 after the entry of the user's password. The postfix sequence may be generated using any suitable approach, such as randomly using a random sequence generator (similar to the prefix sequence). Additionally or alternatively, the postfix sequence may also be generated based on the prefix sequence (see dotted line 252), or the user's password (see dotted line 254), or both.

In more detail, generating the postfix sequence may include determining a set of keys (e.g., see soft keys on keypad 330) that are used for entry of the prefix sequence or the user's password. For example, to increase or maximize the amount of smudges on touch-sensitive display 310, the postfix sequence may be generated to exclude keys used for entry of the prefix sequence or the user's password, or both. In the example in FIG. 3C, the postfix sequence is generated as "7890" such that it does not include numbers in the prefix sequence (e.g., "1234") or the user's password (e.g., "2326").

At block 260 (related to 120 in FIG. 1), computing device 300 prompts user 320 for the entry of the postfix sequence. As shown in the example in FIG. 3C, the postfix sequence (e.g., "7980") may be displayed on touch-sensitive display 310 to prompt user 320 for entry (see also 360). To simplify the entry process, the relevant keys on keypad 330 may be highlighted (e.g., "7", "9", "8" and "0").

At blocks 265 and 270 in FIG. 2 (related to 130 and 140 in FIG. 1), the prefix sequence is received and checked by computing device 300. If correct, at block 275, computing device 300 determines that the authentication is successful. Otherwise, it is determined that authentication is unsuccessful (see block 245). In this case, the authentication process may be repeated, such as starting at block 250, block 230 or block 210.

After performing example process 200, various oily smudges may be left by user 320 on an area of touch-sensitive display 310 where keypad 330 was displayed during the authentication process. Entry of the user's password (e.g., "2326") will only leave smudges on "2", "3" and "6", from which the user's password may be guessed. Entry of the prefix sequence ("1234") and postfix sequence ("7980") using the same keypad 330 further increases the amount of smudges, making it more difficult to discern the user's password.

Figure 3A:
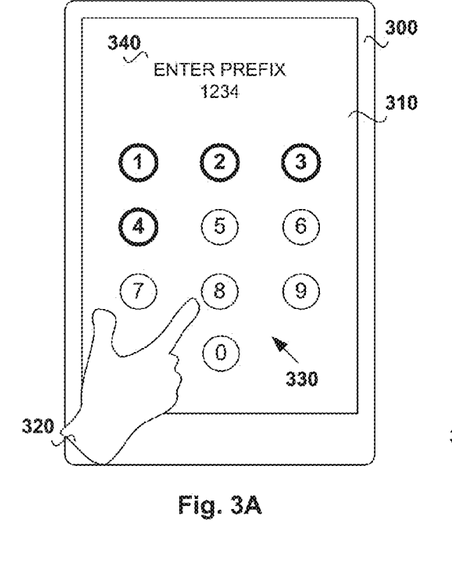
FIGS. 3A, 3B, 3C and 3D illustrate example user interfaces of a computing device during password authentication where the user's password is entered via a soft keypad.
Figure 3B:
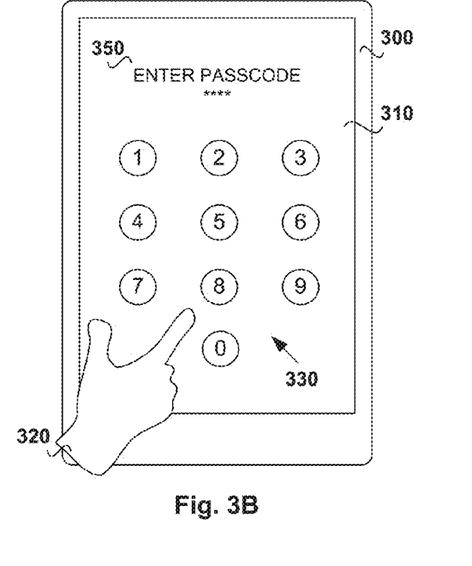
Figure 3C:
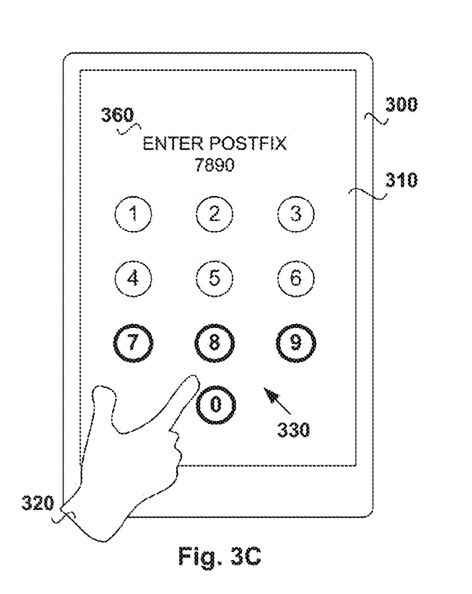
Figure 3D:
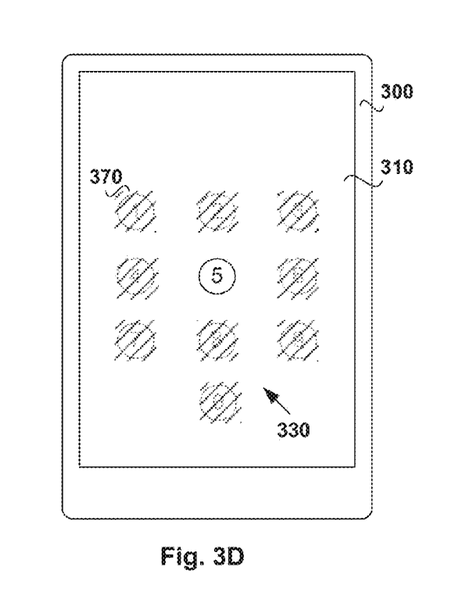

Referring to the example FIG. 3D, oily smudges (e.g., see 370) may be detected on keys associated with "1", "2", "3" and "4" (after entering the prefix sequence); "2", "3" and "6" (after entering the user's password); and "7", "9", "8" and "0" (after entering the postfix sequence). The additional smudges due to the entry of the prefix sequence and postfix sequence may therefore disguise the entry of the user's password. Based on smudge pattern 370 in FIG. 3D, the user's password may be any 4-code digit from 9 numbers, i.e. a total of 3024 possibilities.

In other examples (not shown in FIG. 2 for simplicity), authentication may take place after the prefix sequence, user's password, and postfix sequence are received. In this case, example process 200 may proceed to block 230 after block 220 (i.e. entry of the prefix sequence is received), and block 250 after block 235 (i.e. entry of the user's password is received). At block 270, the received prefix sequence, user's password and postfix sequence may then be checked to determine whether authentication is successful or otherwise.

FIGS. 4A, 4B, 4C and 4D illustrate example user interfaces of computing device 300 during password authentication where the user's password is entered via soft keyboard 410. Similar to the examples in FIGS. 3A, 3B, 3C and 3D, computing device 300 (e.g., smart phone, tablet computer, smart watch, etc.) includes an input interface in the form of touch-sensitive display 310 that displays soft keyboard 410 with alphanumeric keys (e.g., "A" to "Z" and "0" to "9") and functional keys (e.g., "Done", "Submit").

Figure 4A:
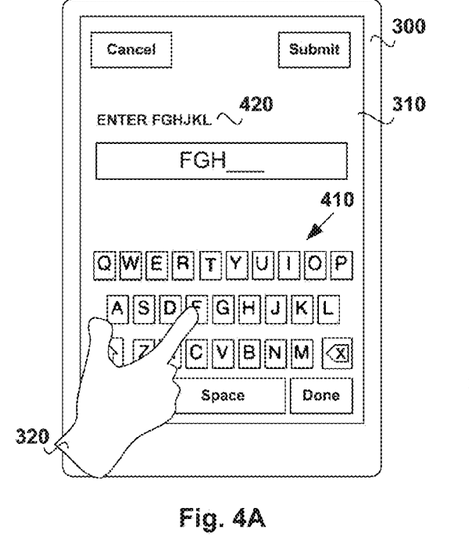
FIGS. 4A, 4B, 4C and 4D illustrate example user interfaces of a computing device during password authentication where the user's password is entered via a soft keyboard.

Using example process 200, computing device 300 in FIG. 4A may generate a prefix sequence (see block 210 in FIG. 2), prompt the entry of the prefix sequence (see blocks 215 and 220) and check whether the entry is correct (see block 225). In the example in FIG. 4A, the prefix sequence is generated as "FGHJKL" (see 420) and displayed on touch-sensitive display 310 to prompt user 320 for entry using soft keyboard 410.

Figure 4B:
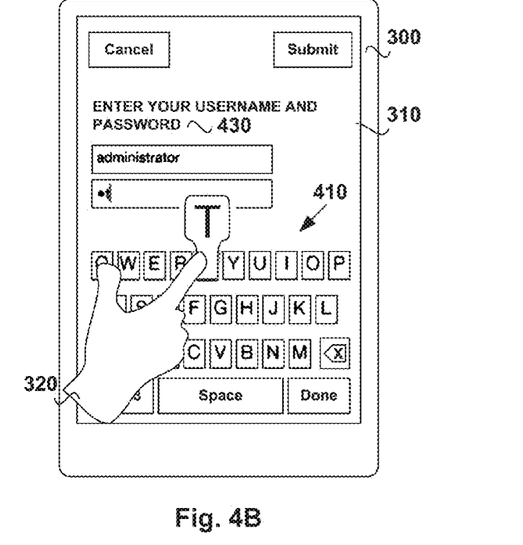

Referring to FIG. 4B, computing device 300 may then prompt for the entry of the user's password (see blocks 230 and 235 in FIG. 2) and check whether the entry is correct (see block 240). As indicated at 430 in FIG. 4B, user 320 is prompted to enter a username (e.g., "administrator") and password (e.g., "ATTITUDE") using providing touch inputs on soft keyboard 410.

Figure 4C:
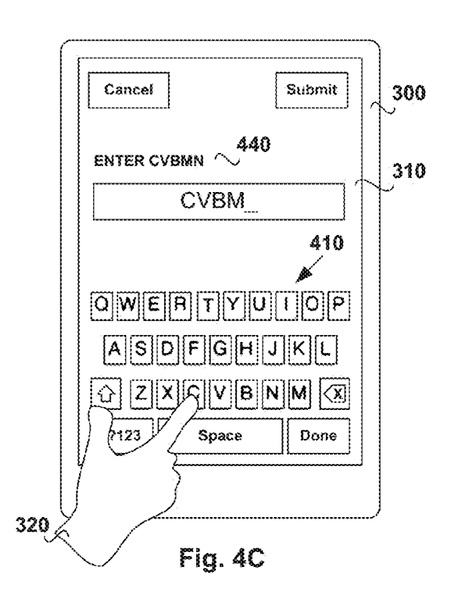

Referring to FIG. 4C, computing device 300 may then generate a postfix sequence (see block 250 in FIG. 2), prompt the entry of the postfix sequence (see blocks 260 and 265) and check whether the entry is correct (see block 270). Similar to the examples in FIG. 3C, the postfix sequence may be generated to exclude at least one key used in prefix sequence (e.g., "FGHJKL") and/or user's password (e.g., "ATTITUDE"). In the example in FIG. 4C, the postfix sequence is generated as "CVBMN" (see 440) and displayed on touch-sensitive display 310 to prompt user 320 for entry using soft keyboard 410.

Figure 4D:
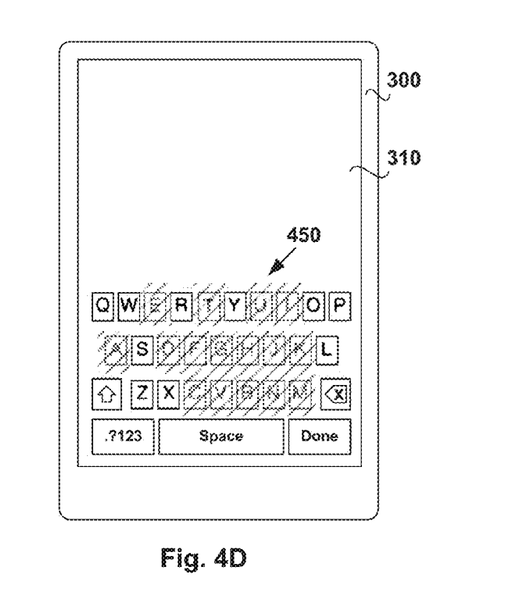

FIG. 4D shows example smudge pattern 450 on touch-sensitive display 310 after the prefix sequence (e.g., "FGHJKL"), user's password (e.g., "ATTITUDE") and postfix sequence (e.g., "CVBMN") are entered. As can be seen, smudges due to the entry of the user's password are disguised by the additional smudges caused by the entry of the prefix sequence and postfix sequence, making it more difficult to guess the user's password.

In some examples, the generation of the prefix sequence (block 210) and postfix sequence (block 250) may be performed based on at least one user configuration. For example, the length of the prefix sequence and postfix sequence may be configurable by user 320. In practice, there may be a trade-off between ease of use (e.g., using shorter and simple sequences) and level of security (e.g., using longer and more complex sequences).

Any other suitable user configuration may be used, such as the complexity of the prefix sequence and postfix sequence; whether to generate the prefix sequence at block 210 and/or postfix sequence at block 250; whether to generate the prefix sequence based on the user's password and whether to generate the postfix sequence based on the prefix sequence and/or user's password at block 250. Further, depending on user configuration, multiple prefix sequences or postfix sequences may be generated. In some applications, the prefix sequence and postfix sequence may be displayed on touch-sensitive display 310 as challenge-response tests to improve security.

The user configuration may also include whether to generate the prefix sequence and postfix sequence based on usage of keys of keypad 330 or soft keyboard 410 outside of the authentication process. The purpose is to further increase or maximize the amount of smudges on touch-sensitive display 310. For example, prior to performing password authentication, computing device 300 may track usage of keypad 330 or soft keyboard 410, such as while user 320 is performing various activities using computing device 300. The prefix sequence and postfix sequence may then be generated based on the tracked usage, such as the general frequency of which keys of keypad 330 or soft keyboard 410 are used.

For example, based on the tracked usage, computing device 300 may determine keys of keypad 330 or soft keyboard 410 that are frequently used (e.g., "5", "7" and "8"), least frequently used (e.g., "2", "3" and "9"), or not used at all (e.g., "1"). In this case, the prefix sequence and postfix sequence may be generated to exclude at least one of the frequently used keys, and include at least one of the least frequently used or not used keys instead. The tracked usage may be reset from time to time, such as daily, every time authentication is performed, when computing device 300 detects that touch-sensitive display 310 has been wiped (e.g., contact with a large area on display 310 is detected), etc.

Although explained using FIGS. 2, 3A, 3B, 3C, 3D, 4A, 4B, 4C and 4D, the examples above (e.g., relating to generation of prefix and postfix sequences, user configuration and usage tracking, etc.) may also be implemented in the examples in FIGS. 5A, 5B, 5C, 5D, 6A, 6B, 6C and 6D below.

Gesture-Based Password Authentication

FIGS. 5A, 5B, 5C and 5D illustrate example user interfaces of computing device 300 during password authentication where the user's password is a gesture-based password. Similar to the examples in FIGS. 3A, 3B, 3C and 3D, computing device 300 (e.g., smart phone, tablet computer, smart watch, etc.) includes an input interface in the form of touch-sensitive display 310.

A gesture-based password may be entered by user 320 by tracing or dragging a finger across touch-sensitive display 310 in conformity with a predefined path. The predefined path may be traced among a grid of user interface elements that represent gesture-based keys 510. The gesture-based password may be a combination of gesture-based keys 510 that are linked in a particular order. Similar to numeric or alphanumeric passwords, it is possible to analyse smudge paths left on touch-sensitive display 310 to discern the user's password. The likelihood of security breaches may be reduced using example process 100 in FIG. 1 and example process 200 in FIG. 2.

Figure 5A:
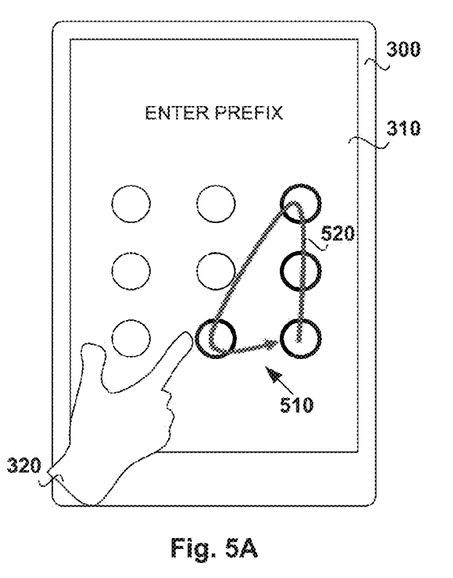
FIGS. 5A, 5B, 5C and 5D illustrate example user interfaces of a computing device during password authentication where the user's password is a gesture-based password.

Referring first to FIG. 5A, computing device 300 may generate a prefix sequence (see block 210), prompt the entry of the prefix sequence (see blocks 215 and 220) and check whether the entry is correct (see block 225). In the example in FIG. 5A, the prefix sequence 520 is displayed on touch-sensitive display 310 to prompt user 320 to enter prefix sequence 520 that links four gesture-based keys 510. To ease the entry process, gesture-based keys 510 associated with prefix sequence 520 may be highlighted.

Figure 5B:
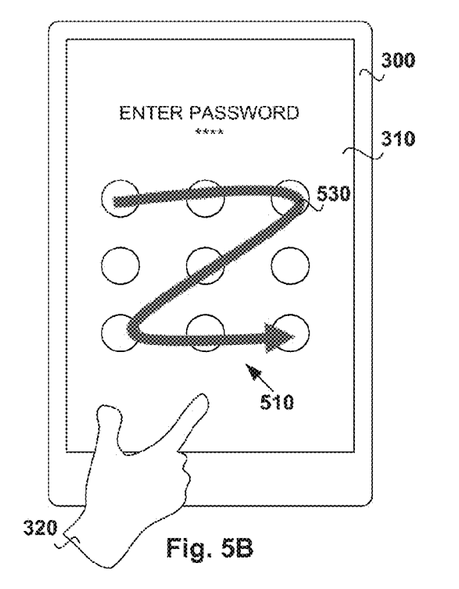

Referring to FIG. 5B, computing device 300 may prompt for the entry of the user's password (see blocks 230 and 235) and check whether the entry is correct (see block 240). For example, the user's gesture-based password in FIG. 5B links a total of seven gesture-based keys 510 to form a generally Z-shaped path 530.

Figure 5C:
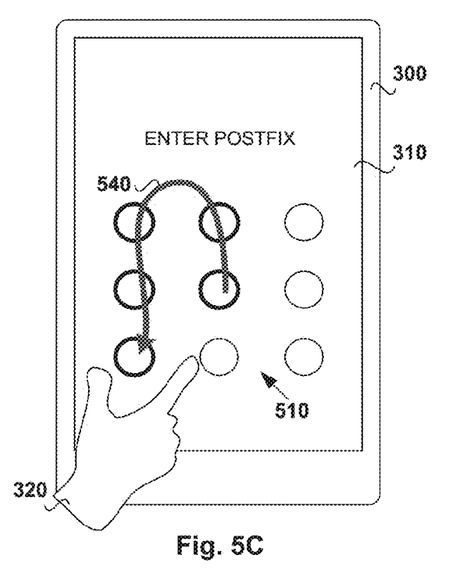

Referring to FIG. 5C, computing device 300 may generate a postfix sequence (see block 250), prompt the entry of the postfix sequence (see blocks 260 and 265) and check whether the entry is correct (see block 270). Similar to the examples in FIG. 3C and FIG. 4C, the postfix sequence may be generated to exclude at least one user interface element 510 used in prefix sequence and/or user's password. In the example FIG. 5C, the postfix sequence links gesture-based keys 510 to form a generally inverted U-shaped path 540. To enter the postfix sequence, user 320 is required to use keys 510 that are not used to enter the prefix sequence (see 520 in FIG. 5A).

Figure 5D:
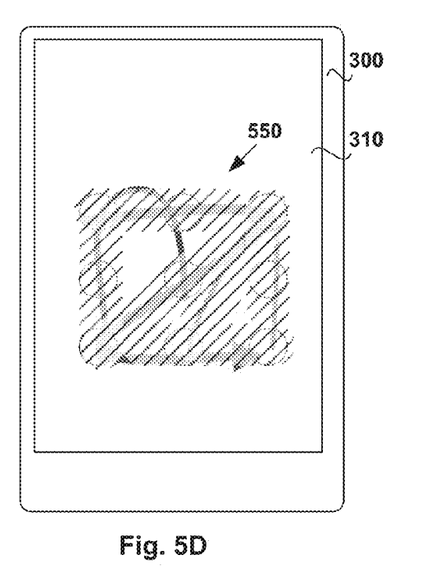

FIG. 5D shows an example smudge pattern (see 550) on touch-sensitive display 310 after entering the prefix sequence (see 520), user's password (see 530) and postfix sequence (see 540). In this example, there are smudges on all gesture-based keys 510 and paths going in different directions, thereby disguising (and making it more difficult to discern) the user's Z-shaped password.

ATM and POS Terminal

FIGS. 6A, 6B, 6C and 6D illustrate example user interfaces of electronic device 600 during password authentication where the user's password is entered via physical keypad 630. In the examples shown, electronic device 600 may be an ATM or POS terminal having display 610 and physical keypad 630. When conducting a transaction or accessing funds using electronic device 600, user 620 interacts with physical keypad 630 to enter the user's PIN using numeric keys (e.g., "0" to "9") and functional keys (e.g., "ENTER", "CLEAR", etc.).

Although not shown for simplicity, electronic device 600 generally includes a card reader to read magnetically encoded data on a transaction instrument (e.g., bank card, smart card). In some examples, electronic device 600 may include a contactless chip reader, a wireless transceiver or any other suitable interface for exchanging transaction information with the transaction instrument. An ATM further includes an item dispenser, for example to dispense notes. Electronic device 600 may be connected to a payment network for transaction approvals.

Using example process 200 in FIG. 2, electronic device 600 may generate a prefix sequence (see block 210 in FIG. 2), prompt the entry of the prefix sequence (see blocks 215 and 220) and check whether the entry is correct (see block 225). In the example in FIG. 6A, the prefix sequence is generated as "1234" (see 640) and displayed on display 610 to prompt user 620 to enter the prefix sequence via physical keypad 630.

Figure 6A:
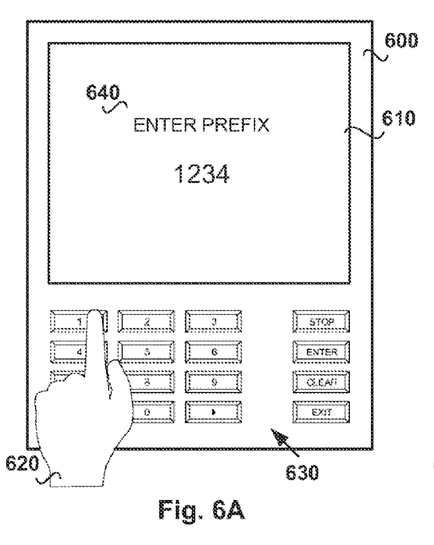
FIGS. 6A, 6B, 6C and 6D illustrate example user interfaces of an ATM or POS terminal during password authentication where the user's password is entered using a physical keypad.
Figure 6B:
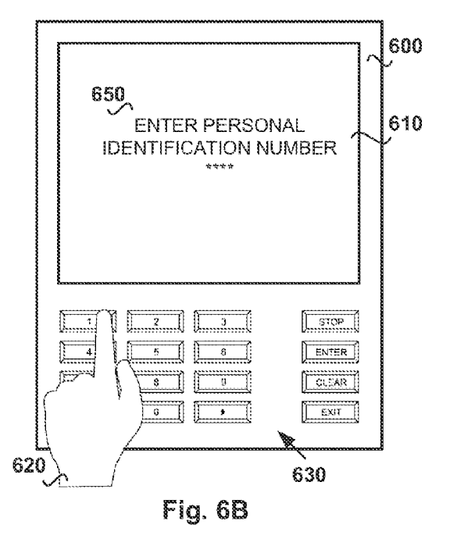

Referring to FIG. 6B, electronic device 600 may then prompt for the entry of the user's PIN (see blocks 230 and 235 in FIG. 2) and check whether the entry is correct (see block 240). As indicated at 650 in FIG. 6B, user 320 is prompted to enter the user's PIN (e.g., "4523") via physical keypad 630.

Figure 6C:
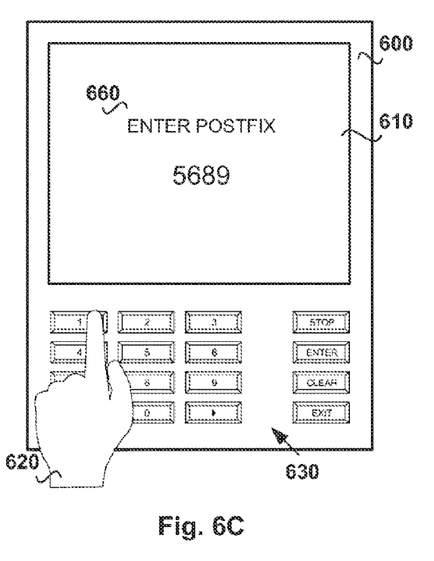

Referring to FIG. 6C, electronic device 600 may generate a postfix sequence (see block 250), prompt the entry of the postfix sequence (see blocks 260 and 265) and check whether the entry is correct (see block 270). The postfix sequence may be generated based on the prefix sequence and/or the user's PIN, for example to include at least one key (e.g., see hard keys of keypad 630) that is not used for entering the prefix sequence and/or the user's PIN. In the example in FIG. 6C, the postfix sequence of "5689" (see 660) is generated and displayed on display 610 to prompt user 620 for entry.

Figure 6D:
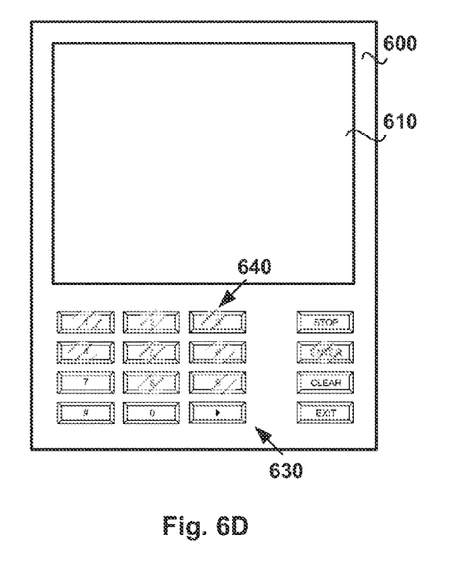

FIG. 6D shows example heat pattern 640 on physical keypad 630 after the prefix sequence (e.g., "1234"), user's PIN (e.g., "4523") and postfix sequence (e.g., "5689") are entered. Since user 620 leaves heat on various numeric keys (e.g., "1" to "6" and "8" to "9") due to increased contact with physical keypad 630, it would be more difficult to guess the user's PIN based on a thermal image of physical keypad 630.

The examples explained with reference to FIGS. 6A, 6B, 6C and 6D are also applicable to a computing device that is generally used with a physical keyboard, such as a laptop computer, desktop computer, etc.

Computer System

Figure 7:
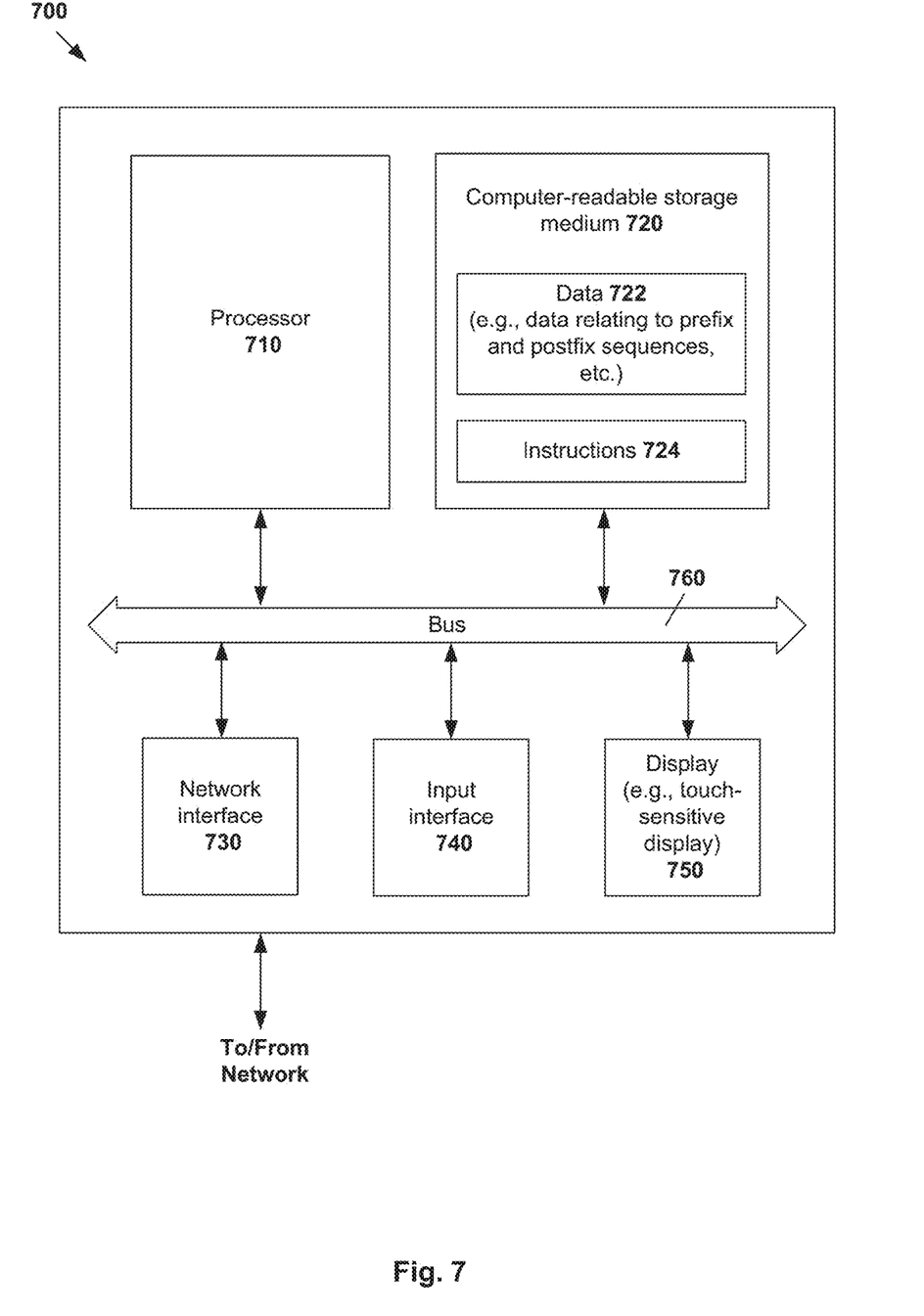
FIG. 7 is a schematic diagram illustrating an example electronic device.

The above examples can be implemented by hardware, software or firmware or a combination thereof. FIG. 7 is a schematic diagram of an example computer system 700 to implement an electronic device (e.g., computing device 300, or ATM or POS terminal 600). Example computer system 700 may include processor 710, computer-readable storage medium 720, network interface 730, input interface 740, display 750 and bus 760 that facilitates communication among these illustrated components and other components. Although shown as separate components, display 750 (e.g., touch-sensitive display) may function as input interface 740.

Processor 710 is to perform processes and examples described herein with reference to FIG. 1 to FIG. 6. Computer-readable storage medium 720 may store any suitable data 722 relating to password authentication, such as data relating to the prefix and postfix sequences, user configuration etc. Computer-readable storage medium 720 may further store computer-readable instructions 724 which, in response to execution by processor 710, cause processor 710 to perform processes described herein with reference to FIG. 1 to FIG. 6.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

Those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or firmware to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). For example, a computer-readable storage medium includes recordable/non recordable media (e.g., read-only memory (ROM), random access memory (RAM), magnetic disk storage media, optical storage media, flash memory devices, etc.).

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. The drawings are only illustrations of an example, wherein the units or procedure shown in the drawings are not necessarily essential for implementing the present disclosure.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

We claim:

1. A method for an electronic device with a display and an input interface to perform password authentication, wherein the input interface includes a set of keys that are contactable during entry of a user's password for authentication, the method comprising:
   generating, by the electronic device, multiple sequences of input elements that include a prefix sequence and a postfix sequence for entry during the authentication, wherein the prefix sequence is generated to require contact with a first subset of keys from the set, the postfix sequence is generated based on the postfix sequence to require contact with a second subset of keys from the set, and the second subset is different to the first subset to disguise entry of the user's password via the input interface by increasing contact with the set of keys;
   prompting, by the electronic device on the display, for an entry of the prefix sequence, user's password and postfix sequence via the input interface, wherein entry of the user's password is prompted after entry of the prefix sequence and before entry of the postfix sequence;
   receiving, by the electronic device via the input interface, entry of the prefix sequence, the user's password and the postfix sequence; and
   determining, by the electronic device, whether the authentication is successful by checking whether the received entry is correct.

2. The method of claim 1, wherein generating the multiple sequences and prompting for the entry comprise:
   before the entry of the user's password is prompted, generating, by the electronic device, the prefix sequence and prompting, on the display, for the entry of the prefix sequence; and
   after the entry of the prefix sequence and user's password is prompted, generating, by the electronic device, the postfix sequence and prompting, on the display, for the entry of the postfix sequence.

3. The method of claim 1, wherein generating the postfix sequence comprises:
   generating, by the electronic device, the postfix sequence based on, at least in part, the user's password.

4. The method of claim 3, wherein generating the postfix sequence based on the user's password comprises:

determining, by the electronic device, a third subset of keys from the set of keys of the input interface that are used for the entry of the user's password; and the electronic device generating the postfix sequence that requires contact with the second subset, wherein the second subset is different to the first subset and third subset.

5. The method of claim 1, wherein generating the prefix sequence comprises: generating, by the electronic device, the prefix sequence based on, at least in part, the user's password.

6. The method of claim 1, wherein generating the prefix sequence comprises: generating, by the electronic device, the prefix sequence randomly using a random sequence generator.

7. The method of claim 1, wherein generating the multiple sequences comprises:
prior to performing the password authentication, tracking, by the electronic device, usage of keys of the input interface; and
based on the tracked usage, generating, by the electronic device, the prefix sequence or postfix sequence to exclude at least one key that is most frequently used, or to include at least one key that is not used or least frequently used.

8. The method of claim 1, wherein generating the multiple sequences is based on a user configuration relating to one or more of the following:
length of the at least one of the multiple sequences;
complexity of the at least one of the multiple sequences;
whether to generate a prefix sequence, a postfix sequence, or both;
whether to track usage of the input interface to generate the multiple sequences;
whether to generate the prefix sequence based on the user's password; and
whether to generate the postfix sequence based on the prefix sequence or user's password, or both.

9. A non-transitory computer-readable storage medium that includes a set of instructions which, in response to execution by a processor of an electronic device, causes the processor to perform a method for password authentication, wherein an input interface of the electronic device includes a set of keys that are contactable during entry of a user's password for authentication the method comprising:
generating, by the processor, multiple sequences of input elements that include a prefix sequence and a postfix sequence for entry during the authentication, wherein the prefix sequence is generated to require contact with a first subset of keys from the set, the postfix sequence is generated based on the postfix sequence to require contact with a second subset of keys from the set, and the second subset is different to the first subset to disguise entry of the user's password via the input interface by increasing contact with the set of keys;
prompting, by the processor on a display of the electronic device, for an entry of the user's password and the multiple sequences via the input interface, wherein entry of the user's password is prompted after entry of the prefix sequence but before entry of the postfix sequence;
receiving, by the processor via the input interface, entry of the user's password and the multiple sequences; and
determining, by the processor, whether the authentication is successful by checking whether the received entry is correct.

10. The non-transitory computer-readable storage medium of claim 9, wherein generating the multiple sequences and prompting for the entry comprise:
before the entry of the user's password is prompted, generating, by the processor, the prefix sequence and prompting, by the processor on the display, for the entry of the prefix sequence; and
after the entry of the prefix sequence and user's password is prompted, generating, by the processor, the postfix sequence and prompting, by the processor on the display, for the entry of the postfix sequence.

11. The non-transitory computer-readable storage medium of claim 9, wherein generating the postfix sequence comprises:
generating, by the processor, the postfix sequence based on, at least in part, the user's password.

12. The non-transitory computer-readable storage medium of claim 11, wherein generating the postfix sequence based on the prefix sequence or user's password comprises:
determining, by the processor, a third subset of keys from the set of keys of the input interface that are used for the entry of the user's password; and
generating, by the processor, the postfix sequence that requires contact with the second subset, wherein the second subset is different to the first subset and third subset.

13. The non-transitory computer-readable storage medium of claim 9, wherein generating, by the processor, the prefix sequence comprises: generating the prefix sequence based on, at least in part, the user's password.

14. The non-transitory computer-readable storage medium of claim 9, wherein generating, by the processor, the prefix sequence comprises: generating the prefix sequence using a random sequence generator.

15. The non-transitory computer-readable storage medium of claim 9, wherein generating the multiple sequences is based on a user configuration relating to one or more of the following:
length of the at least one of the multiple sequences;
complexity of the at least one of the multiple sequences;
whether to generate a prefix sequence, a postfix sequence, or both;
whether to track usage of the input interface to generate the multiple sequences;
whether to generate the prefix sequence based on the user's password; and
whether to generate the postfix sequence based on the prefix sequence or user's password, or both.

16. The non-transitory computer-readable storage medium of claim 9, wherein generating the multiple sequences comprises:
prior to performing the password authentication, tracking, by the processor, usage of keys of the input interface; and
based on the tracked usage, generating, by the processor, the prefix sequence or postfix sequence to exclude at least one key that is most frequently used, or to include at least one key that is not used or least frequently used.

17. An electronic device for password authentication, comprising:
a processor;
a display;
an input interface that includes a set of keys that are contactable during entry of a user's password for authentication; and a non-transitory computer-readable medium having stored thereon instructions that, when executed by the processor, cause:
  the processor to generate multiple sequences of input elements that include a prefix sequence and a postfix sequence for entry during the authentication, wherein the prefix sequence is generated to require contact with a first subset of keys from the set, the postfix sequence is generated based on the postfix sequence to require contact with a second subset of keys from the set, and the second subset is different to the first subset to disguise entry of the user's password via the input interface by increasing contact with the set of keys;
  the processor to prompt, on the display, for an entry of the user's password and the multiple sequences via the input interface, wherein entry of the user's password is prompted after entry of the prefix sequence but before entry of the postfix sequence;
  the processor to receive, via the input interface, entry of the user's password and the multiple sequences; and
  the processor to determine whether the authentication is successful by checking whether the received entry is correct.

\* \* \* \* \*